United States Patent [19]

Hanka et al.

[11] 3,988,441
[45] Oct. 26, 1976

[54] ANTIBIOTIC U-43,120 AND PROCESS FOR PREPARING SAME

[75] Inventors: Ladislav J. Hanka; Paul F. Wiley, both of Kalamazoo, Mich.

[73] Assignee: The Upjohn Company, Kalamazoo, Mich.

[22] Filed: Oct. 2, 1975

[21] Appl. No.: 619,074

[52] U.S. Cl. .............................. 424/117; 195/80 R
[51] Int. Cl.² .......................................... A61K 35/74
[58] Field of Search .................... 424/117; 195/80 R

[56] References Cited
UNITED STATES PATENTS 3,655,876  4/1972  Sciavolino et al. .................. 424/117
3,857,936  12/1974  Avgoudelis ........................ 424/117

Primary Examiner—Jerome D. Goldberg
Attorney, Agent, or Firm—Roman Saliwanchik

[57] ABSTRACT

New antibiotic U-43,120 producible by the controlled fermentation of the new microorganism *Streptomyces paulus*, NRRL 8115.

This antibiotic is active against Gram-positive and Gram-negative bacteria. Accordingly, it can be used in various environments to eradicate or control such bacteria.

2 Claims, 5 Drawing Figures

ANTIBIOTIC U-43,120 AND PROCESS FOR PREPARING SAME

BRIEF SUMMARY OF THE INVENTION

The novel antibiotic of the invention, U-43,120 is obtained by culturing a new microorganism *Streptomyces paulus*, NRRL 8115, in an aqueous nutrient medium under aerobic conditions. Antibiotic U-43,120 and its metal salts have the property of adversely affecting the growth of Gram-positive bacteria, for example, *Staphylococcus aureus*, *Streptococcus hemolyticus*, *Diplococcus pneumoniae*, and *Streptococcus faecalis*; and Gram-negative bacteria, for example, *Escherichia coli*, *Proteus vulgaris*, *Klebsiella pneumoniae*, and *Pseudomonas aeruginosa*. Accordingly, U-43,120 and its metal addition salts can be used alone or in combination with other antibiotic agents to prevent the growth of or reduce the number of bacteria, as disclosed above, in various environments.

DETAILED DESCRIPTION OF THE INVENTION

Chemical and Physical Properties of U-43,120

Molecular Formula: $C_{34}H_{44}N_2SO_{18}$ (Calculated on the basis of analysis).

Elemental Analysis: Calcd.: C, 51.00; H, 5.53; N, 3.50; S, 4.01, O, 35.96. Found: C, 50.64, 51.34; H, 5.88, 6.00; N, 3.60, 3.65; S, 4.07, 4.06; O, 34.41.

Molecular Weight: 800.6

Melting Point: 119°–122° C.

Specific Rotation: $[\alpha]_D^{25} = +9.3°$ (c, 1, $CHCl_3$).

Figure 1:
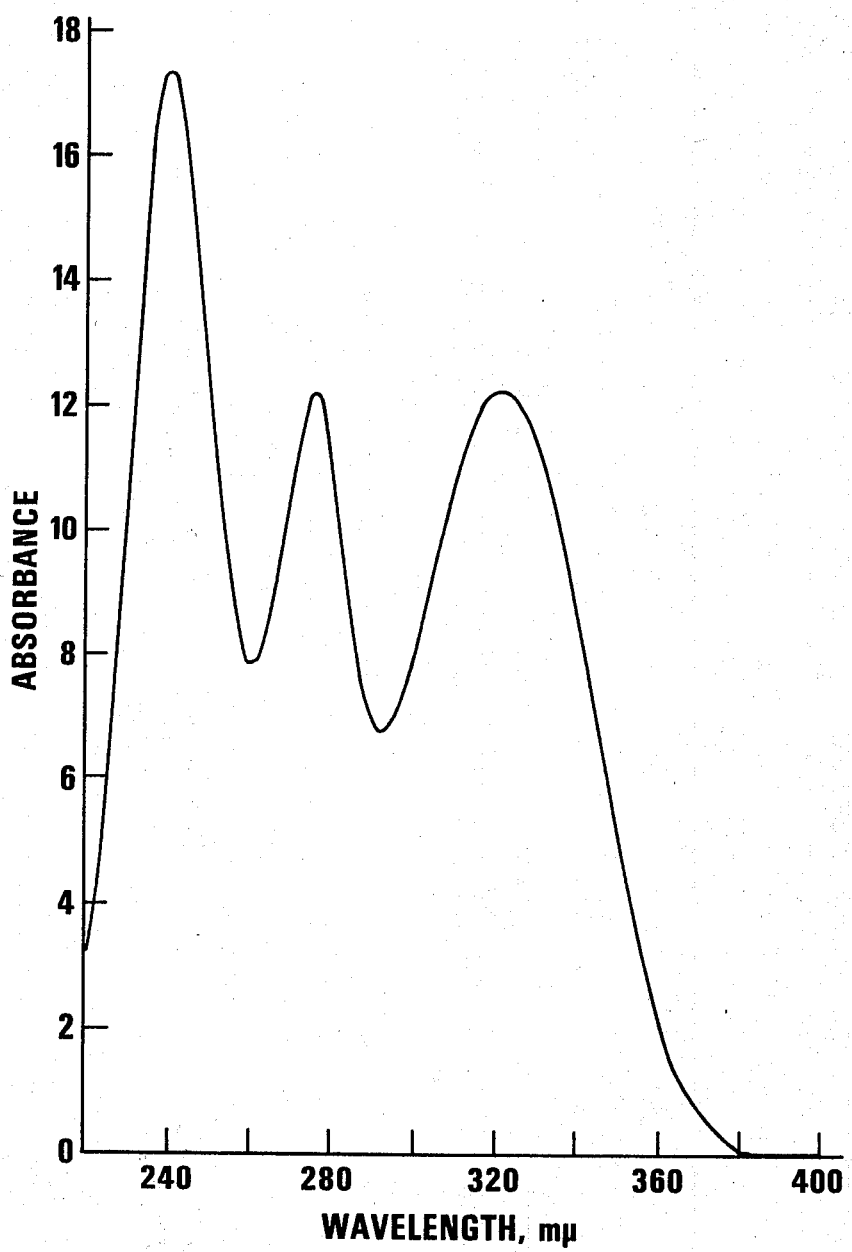

Ultraviolet Absorption Spectrum:

The ultraviolet absorption spectrum of U-43,120 is reproduced in FIG. 1 of the drawings.

Figure 2:
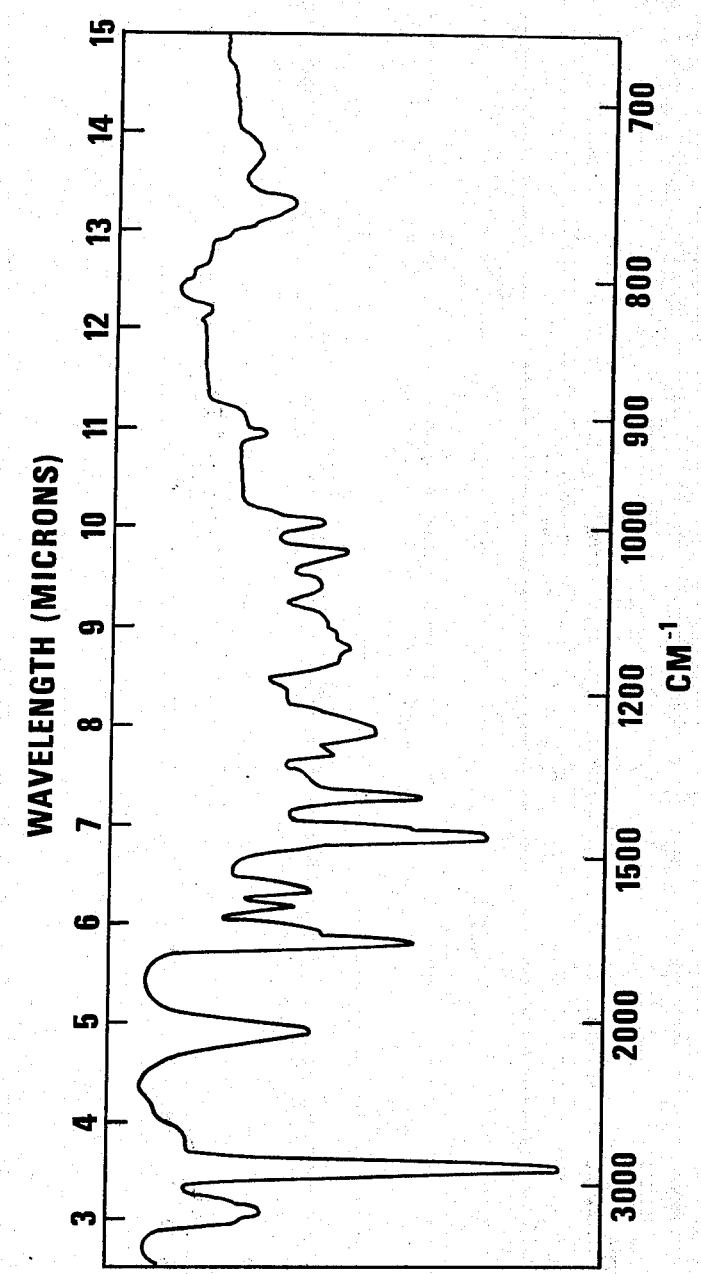

Infrared Absorption Spectrum:

U-43,120 has a characteristic infrared absorption spectrum in a mineral oil mull as shown in FIG. 2 of the drawings. Peaks are observed at the following wave lengths expressed in reciprocal centimeters: 3560, 2070, 1730, 1690 (shoulder), 1620, 1580, 1295, 1260, 1140, 1060, 1025, 993, 913, 820, 753 and 725.

Figure 3:
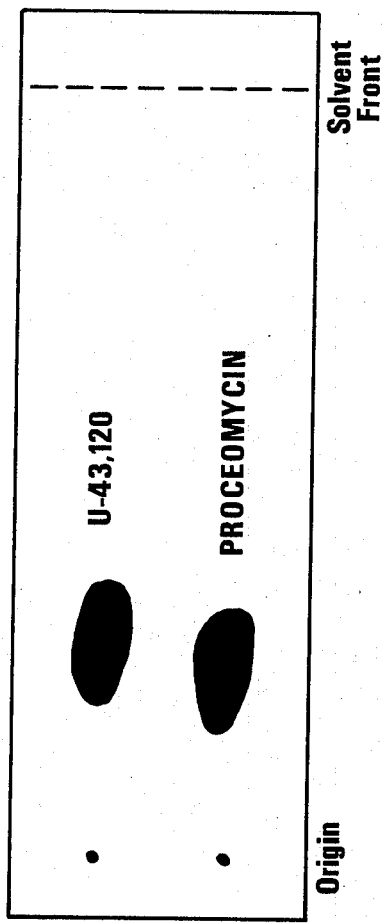

Thin layer chromatography comparison with proceomycin:

FIG. 3 of the drawings shows the movement of antibiotic U-43,120 on a silica plate (silica gel on microscope slide) using a solvent system consisting of ethyl acetate:ethanol:water (92:5:3).

Figure 4:
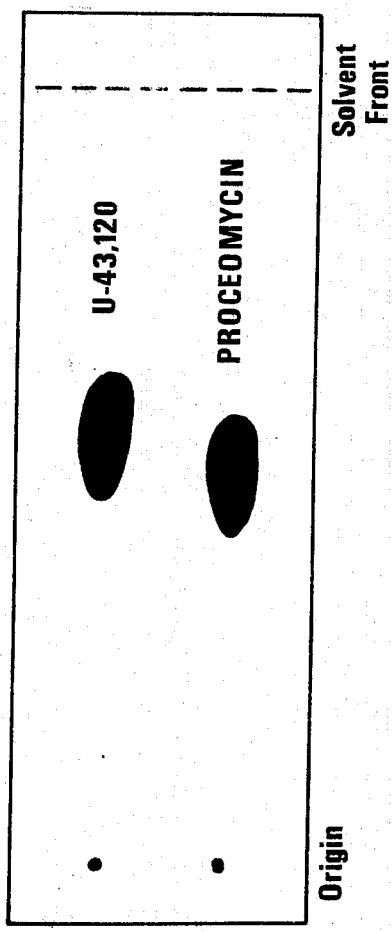

FIG. 4 of the drawings shows a comparison of the movement of antibiotic U-43,120 and proceomycin on a silica plate, as described above. This plate was developed with the solvent system ethanol:methanol:water (10:9:1).

In the tlc of both FIGS. 3 and 4, the starting material is dissolved in methylene chloride at a concentration of 5 mg/ml. Two γ of solution is then applied to the tlc plate.

In addition to the above tlc of antibiotic U-43,120, it has also been determined that U-43,120 has an $R_f$ of 0.62 inches on a silica plate using the solvent system methyl ethyl ketone:acetone:water (70:20:11).

Solubilities:

Soluble in chlorinated hydrocarbons, ethyl acetate, lower alcohols, pyridine, and acetone.

Figure 5:
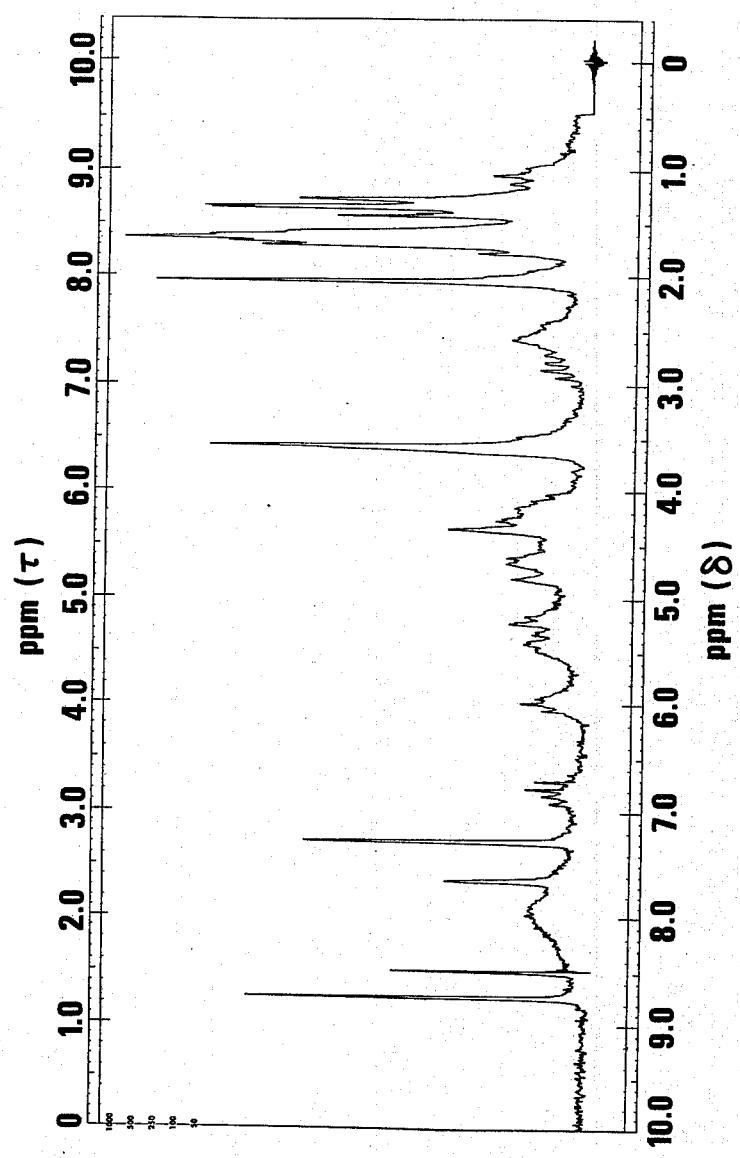

Nuclear Magnetic Resonance (NMR):

The NMR spectrum of antibiotic U-43,120 at 60 megacycles is shown in FIG. 5 of the drawings. The NMR spectrum was observed on a Varian A-60 spectrometer on a solution (ca. 0.5 ml., ca. 15% concentration) of the sample of U-43,120 in deuterated pyridine ($D_5C_5N$). The spectrum was calibrated against internal tetramethylsilane and the precision of the $\Delta y$ was $> \pm$ 1 c.p.s. Frequencies were recorded in c.p.s. downfield from tetramethylsilane.

Antibacterial Activity of U-43,120

| Organism | No. of Strain | Minimal Inhibitory Concentration (µg/ml) |
|---|---|---|
| Staphylococcus aureus | UC 80 | 15.6 |
| Streptococcus hemolyticus | UC 152 | 62.5 |
| Streptococcus faecalis | UC 3235 | 500 |
| Escherichia coli | UC 51 | 500 |
| Proteus vulgaris | UC 93 | 500 |
| Klebsiella pneumoniae | UC 57 | 500 |
| Pseudomonas aeruginosa | UC 95 | 250 |
| Diplococcus pneumoniae | UC 41 | 31.2 |

NOTE: UC refers to The Upjohn Company Culture Collection.

The tube dilution assay procedure was conducted with the medium BHI (Brain Heart Infusion Broth, Difco, Detroit, Michigan). Assay tubes (13 mm × 100 mm) were prepared in the customary manner as set out in Snell, E. E., Vitamin Methods, Volume 1, Academic Press, Inc., New York 1950, p. 327. Test organisms grown for 18 hours at 37° C. were used to inoculate the test medium. The assays were read at 17 hours.

The UC cultures referred to above can be obtained from The Upjohn Company of Kalamazoo, Michigan, upon request.

THE MICROORGANISM

The microorganism used for the production of U-43,120 is *Streptomyces paulus*, NRRL 8115.

A subculture of this microorganism can be obtained from the permanent collection of the Northern Regional Research Laboratory, U.S. Department of Agriculture, Peoria, Illinois, U.S.A. Its accession number in this depository is NRRL 8115. It should be understood that the availability of the culture does not constitute a license to practice the subject invention in derogation of patent rights granted with the subject instrument by governmental action.

The microorganism of this invention was studied and characterized by Alma Dietz of The Upjohn Research Laboratories.

A *Streptomyces sp.* isolated from soil has been characterized. This culture may be placed in the Helvolus series of Gauze [Gauze, G. F., T. P. Preobrazhenskaya, E. S. Kudrina, N. O. Blinov, I. D. Ryabova, and M. A. Iveshnikova. 1957. Problems in the classification of antagonistic actinomycetes. State Publishing House for Medical Literature, Moscow. English edition translated by Fritz Danga; David Gottlieb (ed.). The American Institute of Biological Sciences, Washington, D.C.], the Streptomyceten mit griseus-Luftmycel of Hütter [Hütter, R. 1967. Systematik der Streptomyceten. S. Karger, Basel. 382p.], the variants of *Actinomyces albus* of Krasil'nikov [Krasil'nikov, N. A. 1941. Keys to Actinomycetales. Academy Sciences of the U.S.S.R., Institute of Microbiology. English edition published for the U.S. Department of Agriculture and the National Science Foundation, Washington, D.C., by the Israel Program for Scientific Translations. Jerusalem. 1966.], or the "Yellow series (17.43b)" of Pridham and Tresner in Bergey's Manual, 8th Edition [Buchanan, R. E., and N. E. Gibbons. 1974. Bergey's Manual of Determinative Bacteriology, Eight Edition, The Williams and Wilkins Co., Baltimore]. The soil isolate is differentiated from species in the references cited by the characteristics noted in the Tables. In Table 4 the culture is differentiated from *Streptomyces albidoflavus* [Buchanan, R. E., and N. E. Gibbons. 1974. Bergey's Manual of Determinative Bacteriology, Eight Edition, The Williams and Wilkins Co., Baltimore] [Shirling, E. B., and D. Gottlieb. 1969. Cooperative description of type cultures of *Streptomyces*. IV. Species descriptions from the second, third and fourth studies. Int. J. Syst. Bacteriol. 19:391–512] and *Streptomyces globisporus* [Buchanan, R. E., and N. E. Gibbons. 1974. Bergey's Manual of Determinative Bacteriology, Eight Edition, The Williams and Wilkins Co., Baltimore] [Shirling, E. B., and D. Gottlieb. 1968. Cooperative description of type cultures of *Streptomyces*. III. Additional species descriptions from first and second studies. Int. J. Syst. Bacteriol. 18:280–399]' [Sugimoto, Hiroshi. 1967. Lysis of yeast cell wall by enzymes from streptomycetes. Agr. Biol. Chem. 31:111–1123] the cultures to which it appeared similar.

*S. albidoflavus* is reported to have spiral spore chains by Gauze [Gauze, G. F., T. P. Preobrazhenskaya, E. S. Kudrina, N. O. Blinov, I. D. Ryabova, and M. A. Iveshnikova. 1957. Problems in the classification of antagonistic actinomycetes. State Publishing House for Medical Literature, Moscow. English edition translated by Fritz Danga; David Gottlieb (ed.). The American Institute of Biological Sciences, Washington, D.C.] and is placed in his "Albus Series". *Streptomyces globisporus* of Krasil'nikov [Krasil'nikov, N. A. 1941. Keys to Actinomycetales. Academy Sciences of the U.S.S.R., Institute of Microbiology. English edition published for the U.S. Department of Agriculture and the National Science Foundation, Washington, D.C., by the Israel Program for Scientific Translations. Jerusalem. 1966] belongs to the variants of *Actinomyces globisporus*.

The culture characterized is considered to be a new species of Streptomyces. The consideration is justified by the differences noted in Table 4 and in the references cited for the cultures with which it was compared. The new soil isolate is designated *Streptomyces paulus sp. n.* It is understood that this culture is the type species and that it will become the type variety should cultures with similar properties be isolated.

Color characteristics.

Aerial growth cream to olive. Melanin negative. Appearance on Ektachrome is given in Table 1. Reference color characteristics are given in Table 2. The culture may be placed in the yellow color group of Tresner and Backus [Tresner, H. D., and E. J. Backus. 1963. System of color wheels for streptomycete taxonomy. Appl. Microbiol. 11:335–338].

Microscopic characteristics.

Spore chains long, flexuous (RF) in the sense of Pridham et al. [Pridham, T. G., C. W. Hesseltine, and R. G. Benedict. 1958. A guide for the classification of streptomycetes according to selected groups. Placement of strains in morphological sections. Appl. Microbiol. 6:52–79]. Spore chains may be in tufts. Spores, examined with the scanning electron microscope, appear spherical with a smooth surface. The procedure was that cited by Dietz and Mathews [Dietz, A., and J. Mathews. 1960. Classification of Streptomyces spore surfaces into five groups. Appl. Microbiol. 21:527–533].

Cultural and biochemical characteristics.

Cultural and biochemical characteristics are cited in Table 3.

Carbon utilization.

In the synthetic medium of Pridham and Gottlieb [Pridham, T. G., and D. Gottlieb. 1948. The utilization of carbon compounds by some Actinomycetales as an aid for species determination. J. Bacteriol. 56:107–114], *S. paulus* growth on the control (basal medium without added compound) was moderate. Growth was good on D-xylose, L-arabinose, D-fructose, D-galactose, D-glucose, D-mannose, maltose, cellobiose, dextrin, soluble starch, glycerol, D-mannitol, salicin, sodium citrate, and sodium succinate; moderate on rhamnose, sucrose, lactose, raffinose, inulin, dulcitol, D-sorbitol, and inositol.

Table 1

Appearance of *Streptomyces paulus* on Ektachrome*

| Agar Medium | Surface | Reverse |
| --- | --- | --- |
| Bennett's | Cream-white | Tan |
| Czapek's sucrose | Cream-white | Colorless |
| Maltose-tryptone | Cream-white | Tan |
| Peptone-iron | Cream-white | Tan |
| 0.1 % Tyrosine | Trace cream-white | Tan |
| Casein starch | Trace cream-white | Very pale tan |

*Dietz, A. 1954. Ektachrome transparencies as aids in actinomycete classification. Ann. N. Y. Acad. Sci. 60:152–154.

Table 2

Reference Color Characteristics of *Streptomyces paulus*

| Agar Medium | Determination | Chip No. | ISCC-NBS Color Charts Color | Illustrated with Centroid Colors* |
| --- | --- | --- | --- | --- |
| Bennett's | S | 90 | gy.y. | Grayish yellow |
|  |  | 92 | y.white | Yellowish white |
|  | R | 95 | m.01.Br. | Deep olive |
|  | P | 72 | d.OY | Dark orange yellow |
| Czapek's sucrose | S | 92 | y.white | Yellowish white |
|  | R | 92 | y.white | Yellowish white |
|  | P | — | — | — |
| Maltose-tryptone | S | 92 | y.white | Yellowish white |
|  |  | 93 | y.Gray | Yellowish gray |
|  | R | 95 | m.01.Br. | Deep olive |
|  | P | 94 | l.01.Br. | Olive |
| Hickey-Tresner | S | 92 | y.white | Yellowish white |
|  |  | 90 | gy.y. | Grayish yellow |
|  | R | 77 | m.y.Br. | Yellowish brown |
|  | P | 76 | l.y.Br. | Dull yellowish brown |
| Yeast extract-malt extract (ISP-2) | S | 89 | p.y. | Pale yellow |
|  |  | 90 | gy.y. | Pale yellow |
|  | R | 96 | d.01.Br. | Dark brown |
|  | P | 95 | m.01.Br. | Dark brown |

Table 2-continued

Reference Color Characteristics of *Streptomyces paulus*

ISCC-NBS Color Charts Illustrated with Centroid Colors*

| Agar Medium | Determination | Chip No. | Color | |
|---|---|---|---|---|
| Oatmeal (ISP-3) | S | 92 | y.white | Yellowish white |
| | R | 87 | m.Y. | Yellow Brazil Wood (yellow) |
| | | 88 | d.Y. | Yellow |
| | P | 87 | m.Y. | Yellow Brazil Wood (yellow) |
| Inorganic-salts-starch (ISP-4) | S | 90 | gy.y. | Pale yellow |
| | | 92 to | y.white | Yellowish white |
| | | 105 (edge) | gy.g.Y | Grayish greenish yellow |
| | R | 95 | m.Ol.Br. | Dark brown |
| | P | 91 | d.gy.Y. | Dark grayish yellow |
| Glycerol-asparagine (ISP-5) | S | 92 | y.white | Yellowish white |
| | R | 72 | d.O.Y. | Dark orange yellow |
| | P | 72 | d.O.Y. | Dark orange yellow |

S = Surface
R = Reverse
P = Pigment
*Kelly, K.L., and D.B. Judd. 1955. The ISCC-NBS method of designating colors and a dictionary of color names. U.S. Dept. of Comm. Circ. 553, Washington, D.C.

Table 3

Cultural and Biochemical Characteristics of *Streptomyces paulus*

| Medium | Surface | Reverse | Other Characteristics |
|---|---|---|---|
| Agar | | | |
| Peptone-iron | Pale pink | Yellow-tan with red edge | No pigment<br>Melanin negative |
| Calcium malate | Trace pale yellow | Pale yellow | No pigment<br>Malate slightly solubilized undergrowth |
| Glucose asparagin | Cream | Yellow | Pale yellow pigment |
| Skim milk | — | Tan | Tan pigment<br>Casein solubilized |
| Tyrosine | Cream | Tan | Tan pigment<br>Tyrosine solubilized |
| Xanthine | Cream | Cream olive | Pale yellow-tan pigment<br>Xanthine solubilized |
| Nutrient starch | Cream | Cream olive | Pale yellow-tan pigment<br>Starch solubilized |
| Yeast extract-malt extract | Pale olive-cream | Tan-brown | Pale tan pigment |
| Peptone-yeast extract-iron (ISP-6) | Very slight trace white | Pale yellow tan | No pigment |
| Tyrosine (ISP-7) | Cream | Yellow tan | No pigment |
| Gelatin | | | |
| Plain | Cream white | — | Yellow pigment ¼<br>Liquefaction complete |
| Nutrient | White | — | Yellow pigment<br>Liquefaction complete |
| Broth | | | |
| Synthetic nitrate | Trace white aerial growth on thin surface pellicle | — | Poor compact bottom growth<br>Nitrate not reduced to nitrite |
| Nutrient nitrate | Cream aerial growth on surface pellicle | — | Yellow pigment<br>No bottom growth<br>Nitrate reduced to nitrite |
| Litmus milk | Blue-gray aerial growth on surface pellicle<br>Blue-gray-green surface ring | — | Peptonization-partial to complete<br>Litmus reduced pH 7.4–7.6 |

Table 4

Comparison of *Streptomyces paulus*, *Streptomyces albidoflavus*, and *Streptomyces globisporus*

| Test Condition | *Streptomyces paulus* NRRL 8115 | UC 2190 (CBS)* | *Streptomyces albidoflavus* CBS 416.34 (ISP 5455)** |
|---|---|---|---|
| Spore chain morphology | Section Rectiflexibilis (RF long) | Section Rectiflexibilis (RF long) | Section Rectiflexibilis (RF long) |
| Spore surface | Smooth | Smooth | Smooth |
| Spore chains | Abundant | Abundant | Sparse |
| Aerial Mass Color | Yellow | Yellow | White or gray |
| Carbon utilization | | | |
| D-glucose | Good | Good | Good |
| L-arabinose | Poor (doubtful) | Poor | Good |
| Sucrose | Poor (doubtful) | Negative | Poor |
| D-xylose | very good | Very good | Doubtful |
| Inositol | Poor | Negative | Doubtful |
| D-fructose | Very good | Good | Doubtful |
| D-mannitol | Very good | Very good | Negative |

Table 4-continued

Comparison of *Streptomyces paulus*, *Streptomyces albidoflavus*, and *Streptomyces globisporus*

| | | | |
|---|---|---|---|
| Rhamnose | Good | Negative | Negative |
| Raffinose | Negative | Negative | Negative |
| Calcium malate agar | Malate slightly solubilized | Malate solubilized | — |
| Peptone-iron agar | Pale pink aerial growth | No aerial growth | — |
| Plain gelatin | Complete liquefaction | No liquefaction | — |
| Nutrient gelatin | complete liquefaction | Trace liquefaction | — |
| Litmus milk | Litmus reduced pH 7.4–7.6 | Litmus reduced pH 6.9 | — |
| Czapek's sucrose agar | Good aerial growth | No aerial growth | — |
| Antibiotic Produced | U-43120 | None cited | None cited |

| Test Condition | *Streptomyces globisporus* UC 5398 (NRRL B-2872)*** | INMI 2302 (ISP-5199)**** |
|---|---|---|
| Spore chain morphology | Section Rectiflexibilis (RF long) | Section Rectiflexibilis (RF long) |
| Spore surface | Smooth | Smooth |
| Spore chains | Abundant | Good |
| Aerial Mass Color | Yellow | Yellow |
| Carbon utilization | | |
| D-glucose | Good | Good |
| L-arabinose | Good | Good |
| Sucrose | Good | Good |
| D-xylose | Very good | Negative |
| Inositol | Very good | Negative |
| D-fructose | Very good | Good |
| D-mannitol | Negative | Good |
| Rhamnose | Very good | Good |
| Raffinose | Negative | Negative |
| Calcium malate agar | Malate not solubilized | — |
| Peptone-iron agar | Cream white aerial growth | — |
| Plain gelatin | Trace liquefaction | — |
| Nutrient gelatin | Complete liquefaction | — |
| Litmus milk | Litmus reduced pH 7.7 | — |
| Czapek's sucrose agar | Fair aerial growth | Excellent |
| Antibiotic Produced | None cited | None cited |

NOTE: UC refers to The Upjohn Company Culture Collection.
*Received in 1954 before CBS cultures were numbered. (probably CBS 416.34 = type strain)
**Shirling, E.B., and D. Gottlieb. 1969. Cooperative description of type cultures of Streptomyces. IV. Species descriptions from the second, third and fourth studies. Int. J. Syst. Bacteriol. 19:391–512.
***Tresner, H.D., and E.J. Backus, 1963. System of color wheels for streptomycete taxonomy. Appl. Microbiol. 11:335–338.
****Shirling, E.B., and D. Gottlieb. 1968. Cooperative description of type cultures of Streptomyces. III. Additional species descriptions from first and second studies. Int. J. Syst. Bacteriol. 18:280–399.

The new compound of the invention is produced when the elaborating organism is grown in an aqueous nutrient medium under submerged aerobic conditions. It is to be understood, also, that for the preparation of limited amounts surface cultures and bottles can be employed. The organism is grown in a nutrient medium containing a carbon source, for example, an assimilable carbohydrate, and a nitrogen source, for example, an assimilable nitrogen compound or proteinaceous material. Preferred carbon sources include glucose, brown sugar, sucrose, glycerol, starch, cornstarch, lactose, dextrin, molasses, and the like. Preferred nitrogen sources include cornsteep liquor, yeast, autolyzed brewer's yeast with milk solids, soybean meal, cottonseed meal, cornmeal, milk solids, pancreatic digest of casein, fish meal, distillers' solids, animal peptone liquors, meat and bone scraps, and the like. Combinations of these carbon and nitrogen sources can be used advantageously. Trace metals, for example, zinc, magnesium, manganese, cobalt, iron, and the like, need not be added to the fermentation media since tap water and unpurified ingredients are used as components of the medium prior to sterilization of the medium.

Production of the compound of the invention can be effected at any temperature conducive to satisfactory growth of the microorganism, for example, between about 18° and 40° C., and preferably between about 20° and 28° C. Ordinarily, optimum production of the compound is obtained in about 3 to 15 days. The medium normally remains acidic during the fermentation. The final pH is dependent, in part, on the buffers present, if any, and in part on the initial pH of the culture medium.

When growth is carried out in large vessels and tanks, it is preferable to use the vegetative form, rather than the spore form, of the microorganism for inoculation to avoid a pronounced lag in the production of the new compound and the attendant inefficient utilization of the equipment. Accordingly, it is desirable to produce a vegetative inoculum in a nutrient broth culture by inoculating this broth culture with an aliquot from a soil, liquid $N_2$ agar plug, or a slant culture. When a young, active vegetative inoculum has thus been secured, it is transferred aseptically to large vessels or tanks. The medium in which the vegetative inoculum is produced can be the same as, or different from, that utilized for the production of the new compound, so long as a good growth of the microorganism is obtained.

A variety of procedures can be employed in the isolation and purification of the compound of the subject invention from fermentation beers, for example, solvent extraction, partition chromatography, silica gel chromatography, liquid-liquid distribution in a Craig apparatus, adsorption on resins, and crystallization from solvents.

In a preferred recovery process the compound of the subject invention is recovered from its culture medium by separation of the mycelia and undissolved solids by conventional means, such as by filtration or centrifugation. The antibiotic is then recovered from the filtered or centrifuged broth by extraction. For the extraction of U-43,120 from the filtered broth, water-immiscible organic solvents in which it is soluble, for example, chloroform, ethylene dichloride, ethyl acetate, and methylene chloride (preferred) can be used. Advantageously, the extraction is carried on after the filtered beer is adjusted to a pH of about 2 to 7 with a mineral acid. The methylene chloride extracts are combined and evaporated to dryness under vacuum.

The first step in purification of the methylene chloride extract, as described above, is the use of silica gel chromatography using as solvents ethyl acetate, ethyl acetate-ethanol-water, ethyl acetate-water, and chloroform-ethyl acetate. The active fractions from the silica gel column can be further purified by countercurrent distribution using cyclohexane-ethyl acetate- 95% ethanol-water (1:1:1:1) as the solvent system. Fractions from the countercurrent distribution can be subjected to further silica gel chromatography to obtain a more active preparation which is thus more pure. A final purification step to yield a pure crystalline product is conducted by using chloroform to crystallize the product from the silica gel chromatography.

Preparations of U-43,120 can be purified by repeated silica gel chromatography, as described above, without resort to countercurrent distribution.

Hereinafter are described non-limiting examples of the process and products of the subject invention. All percentages are by weight and all solvent mixture proportions are by volume unless otherwise noted.

EXAMPLE 1

Part A. Fermentation

A frozen vegetative seed of *Streptomyces paulus*, NRRL 8115, is used to inoculate a series of 500-ml Erlenmyer flasks each containing 100 ml of sterile seed medium consisting of the following ingredients:

| | |
|---|---|
| Glucose monohydrate | 25 g/l |
| Pharmamedia* | 25 g/l |
| Tap water q.s. | 1 liter |

*Pharmamedia is an industrial grade of cottonseed flour produced by Traders Oil Mill Company, Fort Worth, Texas.

The seed medium presterilization pH is 7.2. The seed inoculum is grown for 2 days at 25° C. on a Gump rotary shaker operating at 250 r.p.m. and having a 2½ inch stroke.

Seed inoculum (5%), prepared as described above, is used to inoculate a series of 500 ml fermentation flasks containing 100 ml of sterile fermentation medium consisting of the following ingredients:

| | |
|---|---|
| Glucose monohydrate | 10 g/l |
| Malt extract | 30 g/l |
| Wilson's Peptone Liquor No. 159* | 20 g/l |
| Corn steep liquor | 5 g/l |
| Tap water q.s. | 1 liter |

*Wilson's Peptone Liquor No. 159 is a preparation of hydrolyzed proteins of animal origin.

The inoculated fermentation flasks are incubated at a temperature of 25° C. for 5 days while being shaken on a Gump rotary shaker operating at 250 r.p.m. and having a 2½ inch stroke. Foaming in the fermentation flasks is controlled by the antifoam agent UCON (a synthetic defoamer supplied by Union Carbide, N.Y., N.Y.). A representative 5-day fermentation has the following titers of antibiotic in the fermentation broth:

| Day | Assay, BU/ml |
|---|---|
| 2 | 0 |
| 3 | 38 |
| 4 | 89 |
| 5 | 101 |

The assay is a disc plate biounit assay using the bacterium *Bacillus subtilis* grown on a synthetic medium. The synthetic medium has the following composition:

| | |
|---|---|
| $Na_2HPO_4 \cdot 7H_2O$ | 1.7 g |
| $KH_2PO_4$ | 2.0 g |
| $(NH_4)_2SO_4$ | 1.0 g |
| $MgSO_4$ | 0.1 g |
| Glucose | 2.0 g |
| Bacto Agar* | 15.0 g |
| Distilled water | 1 liter |
| Metallic ion stock solution** | 1 ml |

*Bacto Agar provided by Difco Laboratories, Detroit, Michigan.
**Metallic ion stock solution consists of the following:

| | |
|---|---|
| $NaMoO_4 \cdot 2H_2O$ | 200 µg/ml |
| $CoCl_2$ | 100 µg/ml |
| $CuSO_4$ | 100 µg/ml |
| $MnSO_4$ | 2 mg/ml |
| $CaCl_2$ | 25 mg/ml |
| $FeCl_2 \cdot 4H_2O$ | 5 mg/ml |
| $ZnCl_2$* | 5 mg/ml |

*$ZnCl_2$ has to be dissolved separately using a drop of 0.1 N HCl for 10 ml of water. The stock solution is heated to bring all the compounds in solution, kept standing for 24 hours, and sterile filtered.

This medium is inoculated with a spore suspension of *B. subtilis* ($1.5 \times 10^{10}$ cells/ml) at a rate of 0.5 ml/liter. The beer samples are applied to 12.5 mm diameter adsorbent paper discs (0.08 ml/disc), the assay system is incubated overnight at 37° C., and the zones of inhibition are measured. The potency of the sample is related to the diameter of the inhibition zone by means of the usual standard curve.

A biounit (BU) is defined as the concentration of the antibiotic which gives a 20 mm zone of inhibition under the above assay conditions. Thus, if for example a fermentation beer, or other solution containing the antibiotic, needs to be diluted 1/100 to give a 20 mm zone of inhibition, the potency of such beer or solution is 100 BU per ml.

Part B. Recovery

Antibiotic U-43,120 in beers is detected and assayed by the use of tlc and antibacterial assays. Thin layer chromatograms are run on silica gel plates using 95% aqueous ethanol-water (75:25 v/v) as the solvent system. Bioactivity is detected by bioautography using *B. subtilis*-seeded agar trays as disclosed in Example 1, Part A.

Whole fermentation beer (720 ml), obtained as described above, is filtered with the aid of diatomaceous earth (36 grams) as a filter aid. The filter cake is washed with 180 ml of water. The filtrate (clear beer) has a pH of 6.1 and is adjusted to pH 2.0 with 6 N sulfuric acid. This acidic solution is extracted with four 160-ml portions of methylene chloride. The combined methylene chloride extracts are evaporated to dryness under reduced pressure. The clear beer, the extracted aqueous and the residue are assayed by the disc-plate procedure using *B. subtilis* in synthetic medium, as described above. The results are 18.3 Bu/ml, 4.2 Bu/ml and 56.5 Bu/mg respectively, with 60% of the original antibiotic activity in the solid residue.

Part C. Purification (No. 1) Chromatography on Silica Gel

Three hundred grams of silica gel (E. Merck, Darmstadt) is packed in a 29-mm diameter column using a solvent system consisting of ethyl acetate-ethanol-water (92:5:3). Five grams of a crude preparation of antibiotic U-43,120, prepared as described above, is dissolved in 20 ml of the above solvent system and applied to the silica gel column while washing the column down with two 20-ml portions of solvent. The solvent is eluted with the same solvent system and 240 twenty-ml fractions are collected. Fractions 57–95 are combined on the basis of high activity against *B. subtilis* in a disc-plate assay as described above. Evaporation of the above combined fractions under reduced pressure gives 500 mg of a preparation of antibiotic U-43,120 assaying 118 Bu/ml against *B. subtilis*. This preparation has four to seven times the activity of the starting material, thus giving an activity yield of 50 to 60%.

(No. 2) Countercurrent Distribution

Fifty grams of the preparation of antibiotic U-43,120 prepared as described in Part C, No. 1, is purified further by countercurrent distribution in a 200-tube, 50-ml per phase machine using cyclohexane-ethyl acetate-95% ethanol-water (1:1:1:1) as the solvent system and running 200 transfers. The contents of the tubes are analyzed by weight and by activity against *B. subtilis*. The peak activity is at fraction 150, and the peak weight is at fraction 190. Fractions 116–175 are combined, and the pool is evaporated to dryness under reduced pressure. The resulting residue is assayed using *B. subtilis* and is found to be about 5 times as active as the starting material, and about 30% of the activity is recovered.

(No. 3) Second Chromatography on Silica Gel Column

Fourteen and four-tenths grams of a preparation of antibiotic U-43,120 which has been purified by countercurrent distribution, as described above, is chromatographed on 1080 grams of silica gel using ethyl acetate-ethanol-water (92:5:3) as the solvent system. The antibiotic material is dissolved in 70 ml of solvent and put on the column and further washed down with two more 70-ml portions of solvent. The column is eluted with the same solvent system and 686 twenty-ml fractions are collected. The fractions are analyzed by weight and activity against *B. subtilis*. Fractions 204–395, which have the highest antibiotic activity, are combined and evaporated under reduced pressure. The resulting residue weighs 3.3 g and contains about 90% of the antibiotic activity put on the column. Crystallization of 2.7 g of this U-43,120 product from chloroform gives 0.74 g of a crude crystalline preparation of U-43,120. Five recrystallizations from chloroform gives an essentially pure colorless preparation of antibiotic U-43,120.

The antibiotic of the subject invention has similar properties to those reported for senfolomycins A and B (L. A. Mitscher et al., Antimicrobial Agents and Chemotherapy p. 828 (1965). Senfolomycin A differs from antibiotic U-43,120 because of different $R_f$ values in methyl ethyl ketone-acetone-water (70:20:11) on silica gel plates. Antibiotic U-43,120 moves faster than senfolomycin A on these plates. The optical rotation of senfolomycin B in $CH_3OH$ is $-60°$, whereas the optical rotation of antibiotic U-43,120 in $CH_3OH$ is $-34.9°$. Thus, antibiotic U-43,120 is clearly differentiated from senfolomycin A and B.

Antibiotic U-43,120 also has properties similar to those for preceomycin (H. Tsukiura et al., *J. Antibiotics*, [Tokyo] Ser. A.17, 225, (1964). Antibiotic U-43,120 is differentiated from proceomycin by the following criteria:

|  | Proceomycin | U-43,120 |
|---|---|---|
| Color | Yellowish-orange | White |
| $[\alpha]_D$ | −2.2° (ethanol) | −34.9 ($CH_3OH$) |
| $R_f$ (ethyl acetate-ethanol-water; 92:5:3) | 0.25 | 0.31 |
| $R_f$ (ethanol-methanol-water; 10:9:1) | 0.49 | 0.58 |

Thus, antibiotic U-43,120 is clearly differentiated from proceomycin. See also FIG. 4 of the drawings.

Salts of antibiotic U-43,120 can be formed with inorganic cations, for example, sodium, potassium, lithium, and calcium since antibiotic U-43,120 is weakly acidic. Such salts can be prepared, as for example, by suspending antibiotic U-43,120 in water, adding a dilute base until the pH of the solution is about 10.0 to 11.0, and freeze-drying the solution to provide a dried residue consisting of the U-43,120 salt. Salts of antibiotic U-43,120 can be used for the same biological purposes as the parent compound.

Antibiotic U-43,120, or its salts, can be used to disinfect washed and stacked food utensils contaminated with *S. aureus;* they also can be used as disinfectants on various dental and medical equipment contaminated with *S. aureus* or *Streptococcus hemolyticus*. Further, antibiotic U-43,120, or its salts, can be used as an industrial preservative, for example, as a bacteriostatic rinse for laundered clothes and for impregnating paper and fabrics; and, it is useful for suppressing the growth of sensitive organisms in plate assays and other microbiological media.

The invention described herein was made in the course of, or under, contract PH 43-NCl-69-1023 with the National Cancer Institute, National Institutes of Health, Bethesda, Maryland 20014.

We claim:

1. Antibiotic U-43,120, which is active against various Gram-positive and Gram-negative bacteria and which in its essentially pure form:
   a. has the molecular formula $C_{34}H_{44}N_2SO_{18}$ (calculated on the basis of analysis);
   b. has the following elemental analysis: C, 50.64, 51.34; H, 5.88, 6.00; N, 3.60, 3.65; S, 4.07, 4.06; O, 34.41;
   c. has a specific rotation of $[\alpha]_D^{25} = +9.3°$ (c, 1, $CHCl_3$);
   d. is soluble in chlorinated hydrocarbons, ethyl acetate, lower alcohols, pyridine and acetone;
   e. has a characteristic UV spectrum as shown in FIG. 1 of the drawings;
   f. has a characteristic infrared absorption spectrum when dissolved in a mineral oil mull as shown in FIG. 2 of the drawings;
   g. has a characteristic and differentiating thin layer chromatography spectrum as shown in FIGS. 3 and 4 of the drawings; and h. has a characteristic NMR spectrum as shown in FIG. 5 of the drawings, or inorganic cationic salts thereof.

2. A process for preparing antibiotic U-43,120, as defined in claim 1, which comprises cultivating *Streptomyces paulus*, having the identifying characteristics of NRRL 8115, in an aqueous nutrient medium containing a source of assimilable carbohydrate and assimilable nitrogen under aerobic conditions until substantial antibiotic activity is imparted to said medium.

* * * * *